United States Patent
Spathelf et al.

(10) Patent No.: US 10,437,838 B2
(45) Date of Patent: Oct. 8, 2019

(54) SEARCH NAVIGATION ELEMENT

(71) Applicant: Amazon Technologies, Inc., Seattle, WA (US)

(72) Inventors: Whitney Gale Spathelf, Seattle, WA (US); Erick Cantu-Paz, San Jose, CA (US); Tracy Holloway King, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 503 days.

(21) Appl. No.: 15/082,413

(22) Filed: Mar. 28, 2016

(65) Prior Publication Data

US 2017/0277694 A1   Sep. 28, 2017

(51) Int. Cl.
*G06F 16/2457* (2019.01)
*G06F 16/248* (2019.01)
*G06Q 30/06* (2012.01)
*G06F 16/951* (2019.01)

(52) U.S. Cl.
CPC ...... *G06F 16/24578* (2019.01); *G06F 16/248* (2019.01); *G06F 16/951* (2019.01); *G06Q 30/0625* (2013.01); *G06Q 30/0641* (2013.01)

(58) Field of Classification Search
CPC ............. G06F 17/30598; G06F 16/248; G06F 16/285; G06F 16/24578
See application file for complete search history.

(56) References Cited

U.S. PATENT DOCUMENTS

| | | | | |
|---|---|---|---|---|
| 8,577,879 | B1* | 11/2013 | Hotchkies | G06F 17/30864 707/706 |
| 8,620,891 | B1* | 12/2013 | Thirumalai | G06F 17/30867 707/705 |
| 8,635,212 | B1* | 1/2014 | Bunn | G06F 17/30867 707/706 |
| 9,087,097 | B1 | 7/2015 | Balakrishnan et al. | |
| 2013/0212111 | A1* | 8/2013 | Chashchin | G06F 17/30707 707/740 |
| 2013/0346396 | A1* | 12/2013 | Stamm | G06F 17/30867 707/722 |

OTHER PUBLICATIONS

"Using Standard Deviations to Determine Web Analytics Benchmarks", 2008, blackbeak.com/using-standard-deviations-to-determine-web-analytics-benchmarks.*
International Search Report and Written Opinion in co-pending, related PCT Application No. PCT/US2017/022749, dated Jun. 7, 2017.

* cited by examiner

*Primary Examiner* — Etienne P Leroux
*Assistant Examiner* — Sheryl L Holland
(74) *Attorney, Agent, or Firm* — Thomas Horstemeyer, LLP (57) ABSTRACT

Disclosed are various embodiments for a navigation element. An insertion point is identified in a ranking of search results. A navigation element is included in the search results. A selection of the navigation element modifies a constraint used to generate the search result.

20 Claims, 5 Drawing Sheets

SEARCH NAVIGATION ELEMENT

BACKGROUND

Search queries may include constraints to limit the returned search results. Such constraints may include filters or search categories. Results relevant to the search query may be excluded from the search results due to the imposed constraints. This may result in less relevant items being included in the search results.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Users submitting a search query may also provide various constraints to limit the scope of the applied search. For example, a filter may limit the search results to those satisfying a predefined condition, such as availability through a delivery program, availability within a delivery threshold, a price range, or another condition. As another example, a constraint may include a category or taxonomy node of items to be searched. Due to these constraints, items that may be otherwise relevant to the search query may be excluded from the search result. This may cause less relevant results to appear higher in the search result than if the constraint was not applied.

A search application may identify an insertion point in the search results to include a navigation element. The insertion point may be based on a decline in relevance of the search results, a click through rate, a scroll depth, or other criteria associated with the search results. The navigation element may include a navigation aid such as a hyperlink. When selected, the navigation aid may redirect the client to more relevant search results. For example, the navigation aid may redirect the client to search results responsive to the original query and exclude one or more of the originally applied constraints. As another example, if the constraint includes a category or taxonomy node, the navigation aid may redirect the search results for the original search query applied to a higher level category or taxonomy node. In further examples, the navigation aid may redirect the client to a curated or predefined selection of items. By placing the navigation element at a position in the search results based on a decline in relevance or interaction, a client may be redirected to more relevant results with reduced exposure to less relevant results. The client may also be directed to other sets of results, such as a curated selection of results, or a broader set of results presented due to the expanded scope of search. By presenting the navigation element at a point of increasing exposure to less relevant results, the user is given the ability to stay within a site or system to seek out more relevant results, as opposed to abandoning the site or system. This provides an advantage over existing search systems where a user may be exposed to less relevant results, thereby minimizing the likelihood of abandonment. Reducing abandonment can increase user interactions, thereby increasing purchase rates, conversion rates, and user interaction. Also, this approach can direct users to more relevant results, thereby improving the efficacy of a search engine as a whole.

In the following discussion, a general description of the system and its components is provided, followed by a discussion of the operation of the same.

Figure 1:
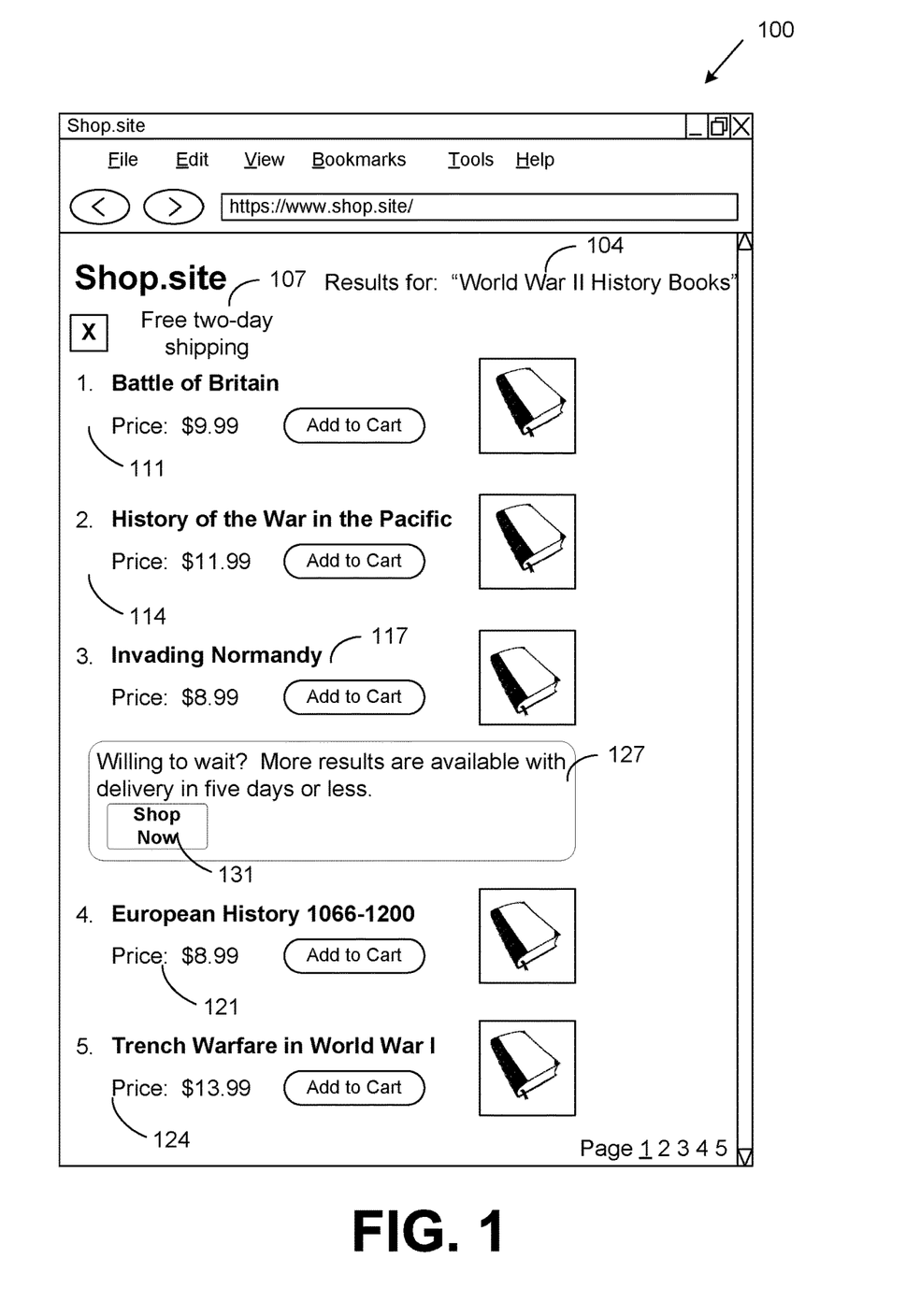
FIG. 1 is a drawing of an example scenario according to various embodiments of the present disclosure.

With reference to FIG. 1, shown is an example scenario 100 depicting a network page including search results responsive to a search query 104 "World War II History Books." The search results are filtered to include only those items available with free two-day shipping, as indicated the selection of the user interface element 107. Search result entries 111, 114 and 117 correspond to items of higher relevance to the query 104. Search result entries 121 and 124 are of comparatively lower relevance, as they are not directly related to World War II history. The navigation element 127 is included at an insertion point between the third and fourth search results. This insertion points reflects the drop in relevance between the third and fourth search results. Within the navigation element 127 is a navigation aid 131 that, when selected, directs the client to search results responsive to the search query 104, but with a delivery window of five days or less. This allows the client to receive additional search results that would otherwise be excluded by the filter of free two-day shipping.

Figure 2:
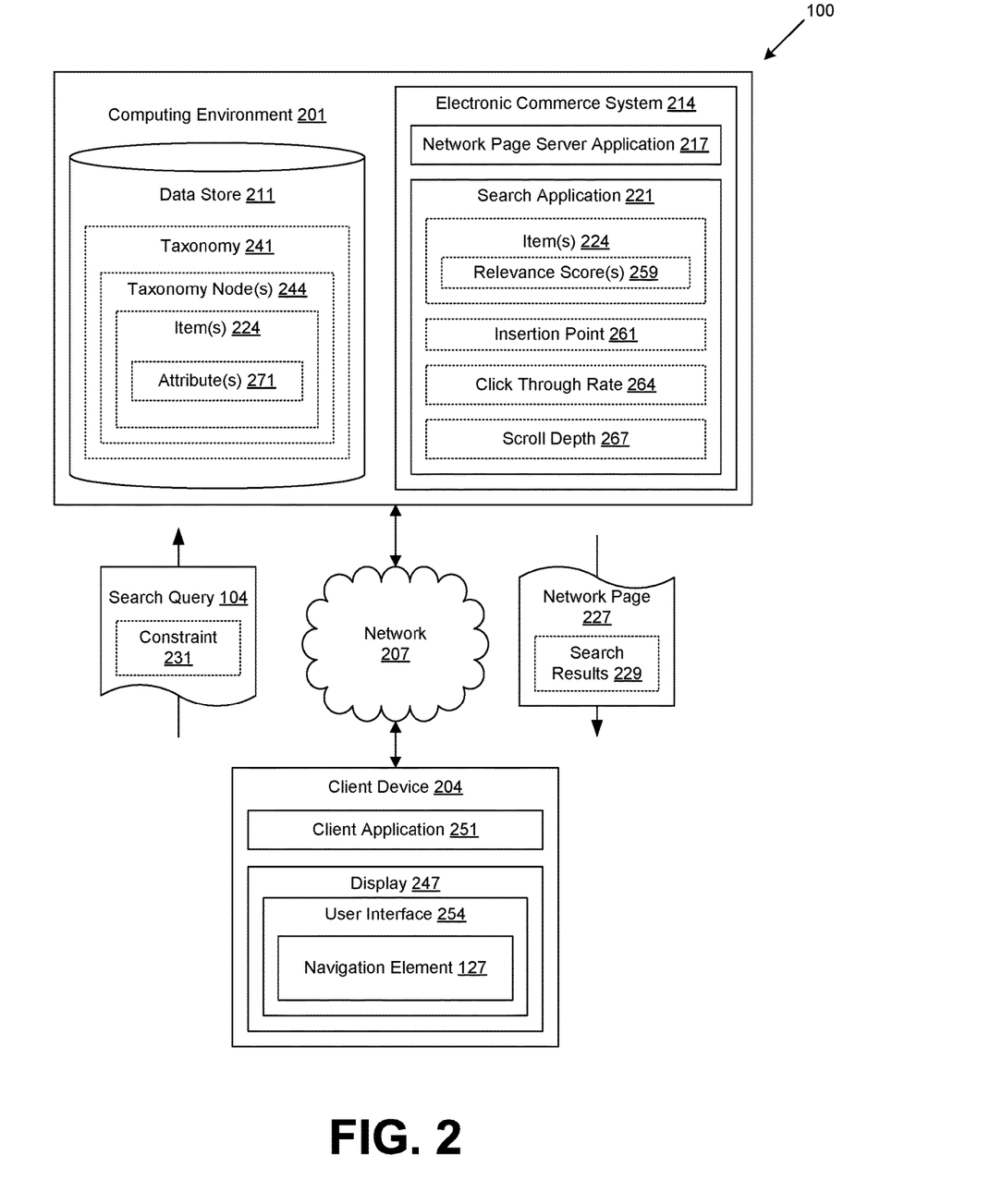
FIG. 2 is a drawing of a networked environment according to various embodiments of the present disclosure.

Turning next to FIG. 2, shown is a networked environment 200 according to various embodiments. The networked environment 100 includes a computing environment 201 and a client 204, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below.

The components executed on the computing environment 103, for example, include an electronic commerce system 214 having a network page server application 217 and a search application 221, and other applications, services, processes, systems, engines, or functionality not discussed in detail herein. The electronic commerce system 214 is executed in order to facilitate the online purchase of items 224 over the network 207. The electronic commerce system 214 also performs various backend functions associated with the online presence of a merchant in order to facilitate the online purchase of items 224 as will be described. For example, the electronic commerce system 214 implements a network page server application 217 to generate network pages 227 such as web pages or other types of network content that are provided to clients 204 for the purposes of selecting items for purchase, rental, download, lease, or other form of consumption as will be described.

The search application 221 is executed to identify one or more items 224 responsive to a search query 104 obtained from a client 204 via the network 207. The identified items 224 are communicated to the client 204 as search results 229. The search application 221 may identify these items 224 according to one or more constrains 231 limiting the scope of a search or the returned search results 229. Additionally, the search application 221 may identify an insertion point 234 within the search results 229 for inclusion of a navigation element 127 that redirects the client 204 to a new set of search results 229 or other listing of items 224, as will be described in more detail below.

The data stored in the data store 211 includes, for example, a taxonomy 241 of items 224, and potentially other data. The taxonomy 241 may be encoded as one or more logically connected taxonomy nodes 244. To this end, the taxonomy nodes 244 may be encoded according to a parent-child relationship, with a parent taxonomy node 244 grouping or connecting one or more child taxonomy nodes 244. In such an embodiment 224, items 224 may then correspond to leaf or descendent taxonomy nodes 244.

The client 204 is representative of a plurality of client devices that may be coupled to the network 207. The client 204 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 204 may include a display 247. The display 247 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 204 may be configured to execute various applications such as a client application 251 and/or other applications. The client application 251 may be executed in a client 204, for example, to access network content served up by the computing environment 201 and/or other servers, thereby rendering a user interface 254 on the display 247. To this end, the client application 251 may comprise, for example, a browser, a dedicated application, etc., and the user interface 254 may comprise a network page, an application screen, etc. The client 204 may be configured to execute applications beyond the client application 251 such as, for example, email applications, social networking applications, word processors, spreadsheets, and/or other applications.

Next, a general description of the operation of the various components of the networked environment 200 is provided. Although the following discussion presents the operations of the search application 221 in the context of an electronic commerce system 214, it is understood that the approaches set forth below are applicable to any search filtered or having a scope defined by one or more constraints 231. To begin, a client 204 communicates a search query 104 to the search application 221 of the electronic commerce system 214 via the network 207. The client 204 may also communicate or indicate one or more constraints 231 for the search query 104. Constraints 231 may serve to define or limit the scope or search when applying the search query 104 to generate search results 229. For example, constraints 231 may indicate a category or taxonomy node 241 of items 224 to which a search query 104 is directed. Constrains 231 may also serve to filter, restrict, or limit items 224 included in the search results 229. For example, constrains 231 may indicate one or more criteria for items 224 responsive to a search query 104 that must be satisfied for inclusion in search results 229. Such criteria may include, for example, price thresholds, delivery times, delivery programs, item 224 conditions, or other criteria.

Next, the search application 221 applies the search query 104 and constraints 231 to the items 224 to select one or more items 224 responsive to the search query 104 according to the constraints 231. In some embodiments, this includes calculating relevance scores 257 for items 224 and selecting items 224 for inclusion in search results 229 based on the relevance scores 257. The items 224 in the search results 229 may be ranked according to the relevance scores 257, or other criteria.

After ranking the items 224 in the search results 229, the search application 221 identifies an insertion point 261 in the rankings for a navigation element 127 that, on interaction, redirects the client 204 to a listing of items 224 other than the generated search results 229, as will be described below. In some embodiments, the insertion point 261 indicates a position between or adjacent to ranked items 224 such that the navigation element 127 is rendered relative to these items 224 in a listing of items 224. In other embodiments, the insertion point 261 may correspond to a depth or browsing position in the listing of items 224. When a client 204 browsing the listing of items 224 browses to the insertion point 261, the navigation element 127 may be rendered as a pop-up, hover, overlay, tray, or other superimposed user interface element.

In some embodiments, the insertion point 261 may include a predefined position in the ranking of items 224 or a predefined browsed pagination. In other embodiments, identifying the insertion point 261 can include identifying a position in the ranking of items 224 according to a decline in relevance scores 259. For example, the insertion point 261 can be defined as a position in the ranking after which the items 224 have relevance scores 259 falling below a predefined threshold. As another example, the insertion point 261 can be identified as a position in the ranking corresponding to a rate of change in relevance scores 259 meeting or exceeding a predefined threshold. In further examples, the insertion point 261 can be identified as a position in the ranking corresponding to a decline in relevance scores 259 by a standard deviation, or any other statistical measure, from a benchmark value. The benchmark value can include, for example, a mean, median, or other aggregate relevance score 259. The insertion point 261 can also be identified as corresponding to a delta or difference between relevance scores 259 for sequentially ranked items 224 meeting or exceeding a threshold. The insertion point 261 can also be identified according to relevance scores 259 by another approach.

Other values may also be used as described above in place of or in conjunction with relevance scores 259. Such values may include a click through rate 264, indicating a percentage or probability that a user receiving an indication of an item 224 in search results 229 would select the item 224 for browsing. Another example of a value may include conversion rate of a corresponding item 224, indicating a rate at which the item 224 is ultimately purchased after selection or browsing. A scroll depth 267 of search results 229 may also be used to identify the insertion point 261. The scroll depth 267 indicates a browsed position or depth in a ranking of search results 229 after which a user abandons a current search. Abandonment may be indicated by leaving a currently browsed network page 227 of search results 229, redefinition of a search query 104 or constraint 231, or other action.

Values based on the search query 104 may also be used in approaches similar to those described above in identifying the insertion point 261. This may include, for example, a string similarity between the search query 104 and one or more attributes 271 of the corresponding item 224. This may also include a degree of inclusion of one or more search query 104 keywords in the item 224 attributes 271. Such attributes 271 may include a title, a description, a review, or other string or text value.

In some embodiments, an insertion point 261 may be identified relative to a position identified by an approach described above. For example, the search application 221 may identify a position in a ranking of items 224 corresponding to a decline in relevance scores 259. The insertion point 261 may then be identified as the position in the ranking of items 224, or by incrementing or decrementing the position in the ranking of items 224 by one or more positions.

In further embodiments, the insertion point 261 may be identified by calculating multiple points in the ranking of items 224, and identifying the insertion point 261 based on these intermediate points. For example, the search application 221 may identify a first intermediate points based on a decline in relevance score 259, and a second intermediate point based on a decline in click through rate 264. The insertion point 261 can then be identified as an average between the intermediate points, or another relative point. In some embodiments, the insertion point 261 may be calculated as a weighted average of intermediate points, with weights corresponding to the value used to identify the intermediate points. Continuing with the above example, the search application 221 may assign a higher weight to an intermediate point identified based on relevance scores 259, and lesser weight to an intermediate point identified based on click through rates 264. Although this example describes identifying an insertion point 261 based on two intermediate points, it is understood that additional intermediate points may also be used to identify a final insertion point 261.

As was described above, the insertion point 261 may be calculated by comparing a value to a predefined threshold. In some embodiments, the predefined threshold may be based on a taxonomy node 244, item 224, or other constraint 231 for the search query 104. For example, assume that the insertion point 261 is identified according to a predefined threshold of relevance scores 259, such that lower ranked items 224 have relevance scores 259 falling below the predefined threshold. If the search query 104 is applied using a constraint 231 restricting search to an item 224 category for phone cases, the predefined threshold may be lower or higher than if the constraint 231 restricted the search to an item 224 category for men's shoes.

Next, the search application 221 generates the navigation element 127. In some embodiments, this includes generating the navigation element 127 as including a navigation aid such as a hyperlink. When selected, the navigation aid redirects the client 204 to a new listing of items 224 other than the search results 229. For example, the navigation aid may serve to resubmit the search query 104 used to generate the search results 229, but removing or modifying a previously submitted constraint 231. If the constraint 231 includes a filter, this can include removing the filter. If the constraint 231 includes an item 224 category or taxonomy node 244 defining the scope of the search, this can include modifying the constraint 231 to a higher level or parent item 224 category or taxonomy node 244. Thus, the search query 104 is resubmitted with a broader scope of search. The client 204 is then redirected to a new set of search results 229 responsive to the search query 104 according to a modified or removed constraint 231.

The navigation aid may also serve to submit a modified version of the previously submitted search query 104. For example, the navigation aid may serve to resubmit the search query 104 with one or more keywords removed. On selection of the navigation aid, the client 204 is then redirected to a new set of search results 229 responsive to the modified search query 104. In some embodiments, the navigation aid may redirect a client 204 to a curated or predefined selection of items 224 determined based on the search query 104. The navigation aid in the navigation element 127 may also serve to redirect the client 204 by another approach.

Next, the network page server application 217 encodes a network page 227 including the search results 229 selected by the search application 221. The network page 227 also includes the navigation element 127 at the identified insertion point 261. On rendering of the network page 227 by the client 204, a user interface 254 is rendered including the search results 229 and the navigation element 127 included in-line at the insertion point 261. If selected, the navigation aid of the navigation element 127 redirects the client 204 as described above.

Figure 3:
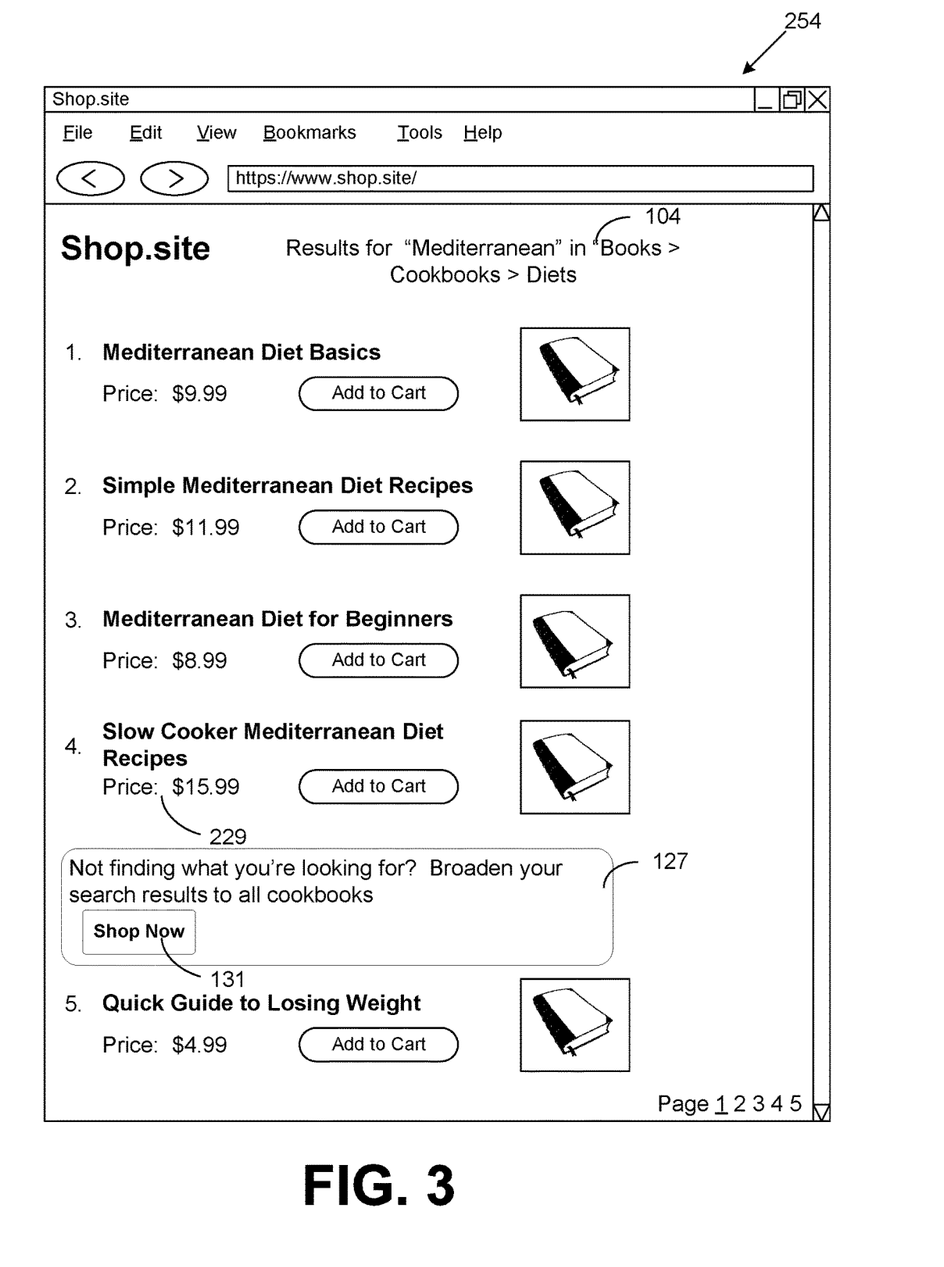
FIG. 3 is a pictorial diagram of an example user interface rendered by a client in the networked environment of FIG. 4 according to various embodiments of the present disclosure.

Referring next to FIG. 3, shown is an example user interface 254 depicting a rendering of a network page 227 (FIG. 2) of search results 229. The depicted search results 229 include items 224 (FIG. 2) responsive to the search query 104 "Mediterranean." The search query 104 has been submitted with a constraint 231 (FIG. 2) limiting the search to a taxonomy node 244 (FIG. 2) "Diets," a child of a "Cookbooks" taxonomy node 244, which is a child of a "Books" taxonomy node 244.

Included in the network page 227 is a navigation element 127 (FIG. 1) between the fourth and fifth entries of the search results 229. This reflects a search application 221 (FIG. 2) having identified an insertion point 261 between the fourth and fifth entries. The navigation element 127 includes a navigation aid 131. The navigation aid 131, when selected, redirects the client 204 to a new set of search results 229 by resubmitting the search query 104 "Mediterranean," but modifying the constraint 231 to the "Cookbooks" taxonomy node 244. Thus, the new constraint 231 is modified to be the parent taxonomy node 244 of the current constraint 231.

Figure 4:
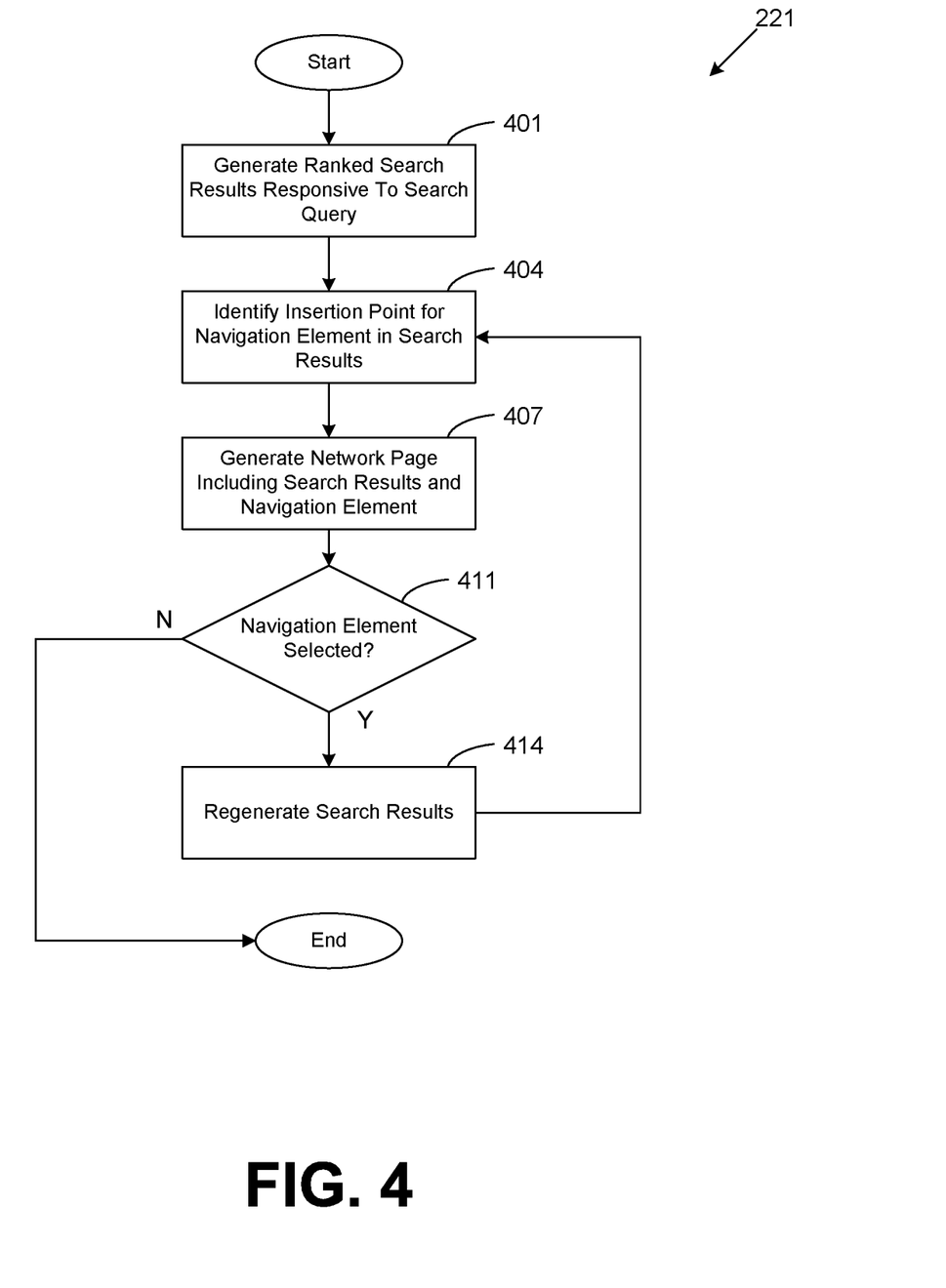
FIG. 4 is a flowchart illustrating one example of functionality implemented as portions of a search application executed in a computing environment in the networked environment of FIG. 2 according to various embodiments of the present disclosure.

Turning now to FIG. 4, shown is a flowchart that provides one example of the operation of a portion of the search application 221 according to various embodiments. It is understood that the flowchart of FIG. 4 provides merely an example of the many different types of functional arrangements that may be employed to implement the operation of the portion of the search application 221 as described herein. As an alternative, the flowchart of FIG. 4 may be viewed as depicting an example of elements of a method implemented in the computing environment 201 (FIG. 2) according to one or more embodiments.

Beginning with box 401, the search application 221 generates a ranked listing of search results 229 (FIG. 2) responsive to a search query 104 (FIG. 1) obtained from a client 204. This may include applying the search query 104 one or more constraints 231 (FIG. 2) from the client 204 to the items 224 (FIG. 2) of a taxonomy 241 (FIG. 2). The constraints 231 may serve to limit the items 224 included in the search result 229 that are otherwise responsive to the search query 104. In other words, the constraint 231 may serve as a filter for the search results 229. In other embodiments, the constraints 231 may serve to limit or refine the scope of the search to a particular item 224 category or taxonomy node 244 (FIG. 2). Ranking the items 224 in the search results 229 includes calculating relevance scores 257 (FIG. 2) for items 224 based on the search query 104. The items 224 are then selected for inclusion in search results 229 and ranked based on the relevance scores 257.

Next, in box 404, the search application 221 identifies an insertion point 261 (FIG. 2) in the search results 229 for a navigation element 127 (FIG. 1). In some embodiments, identifying the insertion point 261 can include identifying a position in the ranking of items 224 according to a one or more values associated with the search results 229. The values can include, for example, the relevance scores 259, click through rates 265, scroll depths 267, or other values. For example, the insertion point 261 can be defined as a position in the ranking after which the items 224 have the corresponding value falling below a predefined threshold. As another example, the insertion point 261 can be identified as a position in the ranking corresponding to a rate of change in the value meeting or exceeding a predefined threshold. In further examples, the insertion point 261 can be identified as a position in the ranking corresponding to a decline in the value as having a standard deviation from a benchmark meeting or exceeding a threshold. The insertion point 261 can also be identified by another approach.

In some embodiments, an insertion point 261 may be identified relative to a position identified by an approach described above. For example, the search application 221 may identify a position in a ranking of items 224 corresponding to a decline in relevance scores 259. The insertion point 261 may then be identified as the position in the ranking of items 224, or by incrementing or decrementing the position in the ranking of items 224 by one or more positions.

In further embodiments, the insertion point 261 may be identified by calculating multiple points in the ranking of items 224, and identifying the insertion point 261 based on these intermediate points. For example, the search application 221 may identify a first intermediate points based on a decline in relevance score 259, and a second intermediate point based on a decline in click through rate 264. The insertion point 261 can then be identified as an average between the intermediate points, or another relative point. In some embodiments, the insertion point 261 may be calculated as a weighted average of intermediate points, with weights corresponding to the value used to identify the intermediate points. Continuing with the above example, the search application 221 may assign a higher weight to an intermediate point identified based on relevance scores 259, and lesser weight to an intermediate point identified based on click through rates 264. Although this example describes identifying an insertion point 261 based on two intermediate points, it is understood that additional intermediate points may also be used to identify a final insertion point 261.

Next, in box 407, the search application 221 queries the network page server application 217 (FIG. 2) to generate a network page 227 (FIG. 2) encoding the search results 229 and a navigation element 127 at the previously identified insertion point 261. In some embodiments, this includes encoding the network page 227 to include the navigation element 127 in-line with the search results 229 at a position corresponding to the insertion point 261. In other embodiments, this includes encoding the network page 227 to include the navigation element 127 for rendering on the client 204 browsing to a predefined position in the ranking, scroll depth 267, pagination, or other portion of the network page 227. Additionally, in some embodiments, generating the network page 227 may include determining or selecting a navigation element 127 to include from multiple possible navigation elements 127. This may be based on, for example, the insertion point 261, the search query 104, the constraints 231 defined by the client 204, or other values. In box 411, a determination is made as to whether the navigation element 127 was selected by a user of the client 204. If not, the process ends. Otherwise, the process advances to box 414 where the search application 221 regenerates the search results 229.

For example, the search application 221 may regenerate the search results 229 by applying the search query 104, but removing or modifying a previously submitted constraint 231. If the constraint 231 includes a filter, this can include removing the filter. If the constraint 231 includes an item 224 category or taxonomy node 244 defining the scope of the search, this can include modifying the constraint 231 to a higher level or parent item 224 category or taxonomy node 244. Thus, the search results 229 are regenerated is resubmitted with a broader scope of search.

Regenerating the search results 229 may also include applying a modified search query 104 to the taxonomy 241 of items 224. For example, the navigation element 127 may serve to resubmit the search query 104 with one or more keywords removed. On selection of the navigation aid, the client 204 is then redirected to a new set of search results 229 responsive to the modified search query 104. The search results 229 may also be regenerated by another approach. After regenerating the search results 229, the process returns to box 404, where a new insertion point 261 is identified for the regenerated search results 229.

Figure 5:
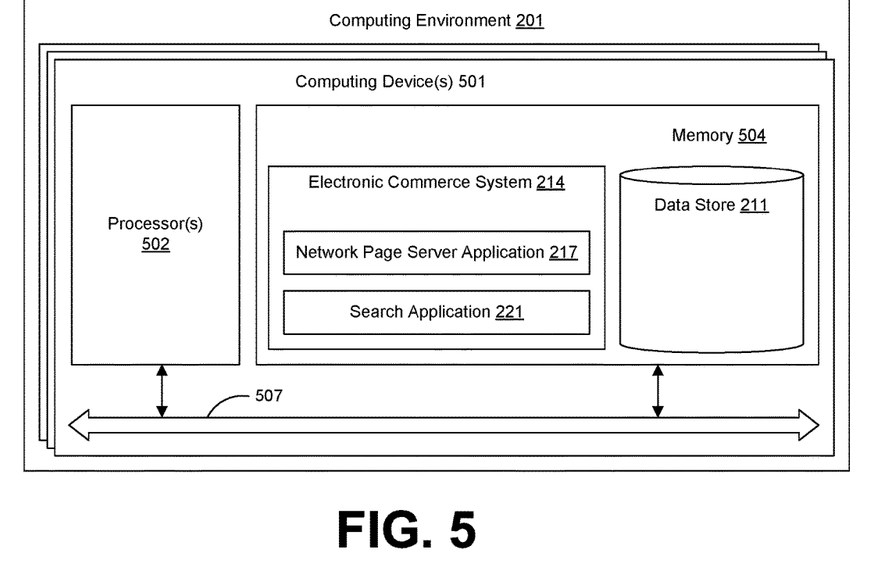
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 201 according to an embodiment of the present disclosure. The computing environment 201 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are an electronic commerce system 214 having a network page server application 217 and search application 221, and potentially other applications. Also stored in the memory 504 may be a data store 211 and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the search application 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the search application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search application 221, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the search application 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 501, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   generate a first plurality of search results as a function of a search query and at least one constraint, wherein the search query is executed using a data store comprising a plurality of taxonomy nodes, and the at least one constraint comprises at least one of the plurality of taxonomy nodes;
   identify an insertion point in a ranked order of the first plurality of search results based at least in part on a first plurality of relevance scores corresponding to a first subset of the first plurality of search results meeting a relevance score threshold for the at least one of the plurality of taxonomy nodes, wherein a first quantity of the first plurality of relevance scores meets the relevance score threshold, the insertion point being located between two respective ranked search results;
   determine a modification to the at least one constraint for generating a second plurality of search results from the data store, wherein the second plurality of search results correspond to a second plurality of relevance scores, wherein a second quantity of the second plurality of relevance scores meets the relevance score threshold, and the second quantity is larger than the first quantity;
   generate a network page comprising at least a portion of the first plurality of search results and a navigation element, the navigation element being included at the insertion point and including the modification to the at least one constraint; and
   generate the second plurality of search results based at least in part on the search query and the modification of the at least one constraint in response to a selection of the navigation element.

2. The non-transitory computer-readable medium of claim 1, wherein the at least one constraint comprises at least one of a filter, a search category, or a taxonomy node.

3. A system, comprising:
   a memory configured to store computer-readable instructions thereon; and
   at least one computing device configured, through the execution of the computer-readable instructions, to at least:
     generate a first plurality of search results as a function of a search query and one or more constraints, the first plurality of search results having a first plurality of relevance scores, wherein the search query is executed using a data store comprising a plurality of taxonomy nodes, and the one or more constraints comprise at least one of the plurality of taxonomy nodes;
     identify, based at least in part on the first plurality of relevance scores for the first plurality of search results, an insertion point in a ranked order of the first plurality of search results, wherein a first quantity of a subset of the first plurality of relevance scores meets a relevance score threshold for the at least one of the plurality of taxonomy nodes, wherein the insertion point is located between two respective ranked search results;
     determine a modification to the one or more constraints for generating a second plurality of search results from the data store, wherein the second plurality of search results correspond to a second plurality of relevance scores, wherein a second quantity of the second plurality of relevance scores meets the relevance score threshold, and the second quantity is larger than the first quantity;
     generate a network page comprising at least a portion of the first plurality of search results and a navigation element, the navigation element being included at the insertion point and including the modification to the one or more constraints; and
     generate the second plurality of search results based at least in part on the search query and the modification to the one or more constraints, the one or more constraints being modified in response to an interaction with the navigation element on the network page.

4. The system of claim 3, wherein the one or more constraints comprise a filter or search category.

5. The system of claim 3, wherein modifying the one or more constraints comprises redefining the one or more constraints as a parent node of the taxonomy node.

6. The system of claim 3, wherein modifying the one or more constraints comprises removing a respective constraint.

7. The system of claim 3, wherein identifying the insertion point comprises:
    identifying, in the first plurality of search results, one of the first plurality of search results having one of the first plurality of relevance scores below the relevance score threshold; and
    identifying the insertion point relative to the one of the first plurality of search results.

8. The system of claim 3, wherein identifying the insertion point comprises:
    identifying, in the first plurality of search results, a position in the first plurality of search results corresponding to a rate of change of the first plurality of relevance scores meeting or exceeding a threshold; and
    identifying the insertion point relative to the position in the first plurality of search results.

9. The system of claim 3, wherein identifying the insertion point comprises:
    identifying, in the first plurality of search results, one of the first plurality of search results having a respective relevance score that is at least a standard deviation from a benchmark value; and
    identifying the insertion point relative to the one of the first plurality of search results.

10. The system of claim 3, wherein identifying the insertion point is further based at least in part on a plurality of click through rates for the first plurality of search results.

11. The system of claim 3, wherein identifying the insertion point is further based at least in part on a plurality of string similarities between the search query and a respective attribute of the first plurality of search results.

12. A method, comprising:
    generating, by at least one computing device, a first plurality of search results as a function of a search query and a constraint, the first plurality of search results having a first plurality of relevance scores, wherein the search query is executed using a data store comprising a plurality of taxonomy nodes, and the constraint comprise at least one of the plurality of taxonomy nodes;
    identifying, by the at least one computing device, based at least in part on the first plurality of relevance scores for a first plurality of search results, an insertion point in a ranked order of the first plurality of search results, wherein a first quantity of a subset of the first plurality of relevance scores meets a relevance score threshold for the at least one of the plurality of taxonomy nodes, wherein the insertion point is located between two respective ranked search results;
    determining, by the at least one computing device, a modification to the constraint for generating a second plurality of search results, wherein the second plurality of search results correspond to a second plurality of relevance scores, wherein a second quantity of the second plurality of relevance scores meets the relevance score threshold, and the second quantity is larger than the first quantity;
    generating, by the at least one computing device, a network page comprising at least a portion of the first plurality of search results and a navigation element at the insertion point, the navigation element including the modification to the constraint; and
    generating, by the at least one computing device, the second plurality of search results based at least in part on the search query and the modification of the constraint, the constraint being modified in response to an interaction with the navigation element on the network page.

13. The method of claim 12, wherein identifying the insertion point comprises:
    identifying, by the at least one computing device, a first point in the first plurality of search results based at least in part on the first plurality of relevance scores;
    identifying, by the at least one computing device, at least one second point in the first plurality of search results based at least in part on at least one other value corresponding to the first plurality of search results; and
    identifying, by the at least one computing device, the insertion point as a function of the first point and the at least one second point.

14. The method of claim 12, wherein the at least one other value comprises at least one of: a click through rate, a string similarity with respect to the search query, or a scroll depth of a plurality of search queries.

15. The method of claim 12, wherein the constraint comprises a search category, and the insertion point is identified as a function of the search category.

16. The method of claim 12, wherein the constraint comprises a search category, and the insertion point is identified as a function of the search category.

17. The method of claim 12, wherein the constraint comprises a filter that defines at least one of: an area of availability, a delivery program, or an estimated arrival time.

18. The method of claim 12, wherein identifying the insertion point comprises:
    identifying, by the at least one computing device, in the first plurality of search results, one of the first plurality of search results having one of the first plurality of relevance scores below a threshold; and
    identifying, by the at least one computing device, the insertion point relative to the one of the first plurality of search results.

19. The method of claim 12, wherein identifying the insertion point comprises:
    identifying, by the at least one computing device, a position in the first plurality of search results corresponding to a rate of change of the first plurality of relevance scores meeting or exceeding a threshold; and
    identifying, by the at least one computing device, the insertion point relative to the position in the first plurality of search results.

20. The method of claim 12, further comprising selecting, by the at least one computing device, the navigation element for display on the network page based at least in part on the insertion point.

* * * * *